United States Patent
Hirayama et al.

(10) Patent No.: US 8,921,468 B2
(45) Date of Patent: Dec. 30, 2014

(54) RUBBER COMPOSITION FOR TIRE, TIRE MEMBER, BASE TREAD RUBBER COMPOSITION, BASE TREAD AND TIRE

(75) Inventors: Tomoaki Hirayama, Kobe (JP); Takao Wada, Kobe (JP); Noboru Wakabayashi, Kobe (JP); Keiji Ikeda, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 169 days.

(21) Appl. No.: 12/600,621

(22) PCT Filed: Mar. 14, 2008

(86) PCT No.: PCT/JP2008/054761
§ 371 (c)(1),
(2), (4) Date: Nov. 17, 2009

(87) PCT Pub. No.: WO2008/149588
PCT Pub. Date: Dec. 11, 2008

(65) Prior Publication Data
US 2010/0163150 A1    Jul. 1, 2010

(30) Foreign Application Priority Data
Jun. 5, 2007    (JP) .................................. 2007-149546
Jun. 12, 2007   (JP) .................................. 2007-155238

(51) Int. Cl.
*C08L 7/00*    (2006.01)
*C08L 15/00*   (2006.01)
(Continued)

(52) U.S. Cl.
CPC .................. *C08L 7/00* (2013.01); *B60C 1/0016* (2013.01); *B60C 1/0025* (2013.01);
(Continued)

(58) Field of Classification Search
CPC ........................... B60C 1/0016; B60C 1/0025
USPC ........ 152/534, 547, 564, 209.5, 905; 524/277
See application file for complete search history.

(56) References Cited

U.S. PATENT DOCUMENTS 2,560,195 A * 7/1951 Smith et al. ..................... 156/62
3,554,949 A * 1/1971 Burke et al. .................. 524/504
(Continued)

FOREIGN PATENT DOCUMENTS

CN    1814435 A    8/2006
CN    1821292 A    8/2006
(Continued)

OTHER PUBLICATIONS

Chinese Office Action dated Aug. 22, 2012, in counterpart Chinese Patent Application No. 200880018755.7 with English translation.
(Continued)

*Primary Examiner* — Justin Fischer
*Assistant Examiner* — Philip N Schwartz
(74) *Attorney, Agent, or Firm* — Birch, Stewart, Kolasch & Birch, LLP

(57) ABSTRACT

A rubber composition for a tire includes a rubber component containing at least one of a natural rubber and an epoxidized natural rubber, silica and a natural based wax, wherein the silica is contained in an amount of 10 parts by mass or more based on 100 parts by mass of the rubber component and the natural based wax is contained in an amount of 1.2% by mass or more and 2% by mass or less based on the total mass of the rubber composition for a tire, and to a tread, a side wall, a clinch and a tire using the rubber composition. A rubber composition for a base tread used to form a base tread of a tire, the rubber composition includes a rubber component composed of a diene based rubber, silica contained in an amount 20 parts by mass or more and 70 parts by mass or less based on 100 parts by mass of the rubber component consisting of a diene based rubber and a natural based wax contained in an amount of 2 parts by mass or more and 15 parts by mass or less based on 100 parts by mass of said rubber component composed of the diene based rubber, and to a base tread and a tire obtained by using the rubber composition for a base tread.

6 Claims, 2 Drawing Sheets

(51) Int. Cl.
*C08L 9/00* (2006.01)
*B60C 11/00* (2006.01)
*B60C 1/00* (2006.01)
*C08K 3/00* (2006.01)
*C08C 19/06* (2006.01)
*C08K 5/548* (2006.01)
*C08L 91/06* (2006.01)

(52) U.S. Cl.
CPC ............... *C08K 3/0033* (2013.01); *C08L 15/00* (2013.01); *B60C 11/005* (2013.01); *C08C 19/06* (2013.01); *C08K 5/548* (2013.01); *C08L 91/06* (2013.01); *Y10S 152/905* (2013.01)
USPC ...................... 524/277; 152/209.1; 152/209.5; 152/905; 524/575.5; 524/612; 524/571

(56) References Cited

U.S. PATENT DOCUMENTS

| | | | |
|---|---|---|---|
| 2001/0047841 A1* | 12/2001 | Oksanen | 152/513 |
| 2003/0100643 A1* | 5/2003 | Kikuchi | 524/265 |
| 2003/0120007 A1 | 6/2003 | Bortolotti et al. | |
| 2005/0209390 A1* | 9/2005 | Yagi et al. | 524/493 |
| 2005/0222311 A1* | 10/2005 | Richter et al. | 524/275 |
| 2006/0174987 A1 | 8/2006 | Hirayama | |
| 2006/0183840 A1 | 8/2006 | Hirayama et al. | |
| 2007/0032593 A1* | 2/2007 | Yagi et al. | 524/575.5 |
| 2007/0240610 A1 | 10/2007 | Kikuchi et al. | |

FOREIGN PATENT DOCUMENTS

| | | |
|---|---|---|
| EP | 1652882 A1 | 5/2006 |
| EP | 1683833 A1 | 7/2006 |
| EP | 1686152 A1 | 8/2006 |
| EP | 1688275 A1 | 8/2006 |
| EP | 1690894 A1 | 8/2006 |
| EP | 1731332 A2 | 12/2006 |
| EP | 1757656 A1 | 2/2007 |
| EP | 1790688 A1 | 5/2007 |
| JP | 5-179071 A | 7/1993 |
| JP | 10-53707 A | 2/1998 |
| JP | 10-87898 A | 4/1998 |
| JP | 11-58384 A | 3/1999 |
| JP | 11-269312 A | 10/1999 |
| JP | 2003-63206 A | 3/2003 |
| JP | 2003-64222 A | 3/2003 |
| JP | 2003-522065 A | 7/2003 |
| JP | 2004-269684 A | 9/2004 |
| JP | 2005-232355 A | 9/2005 |
| JP | 2005-330430 A | 12/2005 |
| JP | 2006-28451 A | 2/2006 |
| JP | 2006-070093 A | 3/2006 |
| JP | 2007-308623 A | 11/2007 |
| JP | 2007-308624 A | 11/2007 |
| KR | 2001-0112545 A | 1/2003 |
| RU | 2190641 C2 | 10/2002 |
| WO | WO-00/53671 A1 | 9/2000 |

OTHER PUBLICATIONS http://fuhtai.com/chinese/material/c-vn3.htm, Ultrasil VN3, prior to Sep. 4, 2012, 1 page.
http://wenku.baidu.com/view/626568eab8f67c1cfad6b894.html, SiO2-EPDM, prior to Aug. 14, 2012, 1 page.
http://wenku.baidu.com/view/db21cc86bceb19e8b8f6afd.html, China Academic Journal Electronic Publishing House, ACTA Polymesica Sinica, May 2007, p. 446.
Chinese Office Action dated Jan. 28, 2013, in counterpart Chinese Patent Application No. 200880018755.7 with English translation.
Korean Office Action dated Apr. 30, 2014 for Application No. 10-2009-7026048 with English language translation.

\* cited by examiner

RUBBER COMPOSITION FOR TIRE, TIRE MEMBER, BASE TREAD RUBBER COMPOSITION, BASE TREAD AND TIRE

TECHNICAL FIELD

The present invention relates to a rubber composition for a tire, a tire member and a tire, and, particularly to, a rubber composition for a tire which can reduce the amount of components derived from petroleum resources to be used and are also superior in ozone resistance and anti-blooming characteristics, and to a tire member and a tire using the rubber composition for a tire.

The present invention also relates to a rubber composition for a base tread, a base tread and a tire, and particularly, to a base tread which can reduce the amount of components derived from petroleum resources to be used and can attain high ozone resistance required for tires and a reduction in the fuel consumption of vehicles and to a base tread and a tire obtained by using the rubber composition for a base tread.

BACKGROUND ART

Generally, ozone resistance is required of the parts constituting the surface of tires such as tire treads and side walls. Therefore, as disclosed in, for example, Japanese Patent Laying-Open No. 2004-269684 (Patent Document 1), waxes using petroleum as a raw material are blended in rubber compositions constituting tire treads and side walls (see, for example, Japanese Patent Laying-Open No. 2004-269684 (Patent Document 1), Paragraph [0021]) to improve the ozone resistance of a tire tread and side wall.

On the other hand, it is necessary that the rubber constituting the outside peripheral surface of tires such as tire treads and side walls is superior not only in ozone resistance but also in anti-blooming characteristics so that the waxes blended to improve ozone resistance is prevented from blooming on the surface of rubber.

Patent Document 1: Japanese Patent Laying-Open No. 2004-269684.

DISCLOSURE OF THE INVENTION

Problems to be Solved by the Invention

A half or more of the total weight of commercially available tires is composed of components derived from petroleum resources. However, because the petroleum resources are limited and a petroleum supply source is reduced year by year, a steep rise in oil prices is predicted in the future, and there is a limit to the use of components, such as petroleum waxes, derived from petroleum resources.

It is therefore required to develop the technologies which reduce the used amount of the components derived from petroleum resources but allow the use of components (components derived from resources other than petroleum resources) which are not derived from petroleum resources as much as possible to make a tire having a strong ozone resistance.

Moreover, environmental problems have come to be regarded as most important in recent years and the regulation made to limit the emission of $CO_2$ is strengthened. This is why the low fuel consumption of vehicles is desired. Therefore, it is also desired to develop the technologies used to produce tires which can attain the low fuel consumption of vehicles.

In view of above mentioned circumstance, it is an object of the present invention to provide a rubber composition for a tire which can reduce the use of the components derived from petroleum resources and is superior in ozone resistance and anti-blooming characteristics, and also to a tire member and a tire using this composition.

Also, another object of the present invention is to provide a rubber composition for a base tread which can reduce the used amount of the components derived from petroleum resources and can attain high ozone resistance required for tires and low fuel consumption of vehicles, and also to provide a base tread and a tire formed using this rubber composition for a base tread.

Means for Solving the Problems

The present invention is a rubber composition for a tire including a rubber component containing at least one of a natural rubber and an epoxidized natural rubber, silica and a natural based wax, wherein silica is contained in an amount of 10 parts by weight or more based on 100 parts by mass of the rubber component and the natural based wax is contained in an amount of 1.2% by mass or more and 2% by mass or less based on the total mass of the rubber composition for a tire.

Here, in the rubber composition for a tire of the present invention, the natural based wax is preferably at least one type selected from the group of carnauba wax, candelilla wax, rice wax and Japan wax.

Also, in the rubber composition for a tire of the present invention, carbon black is contained in an amount of 5 parts by mass or less based on 100 parts by mass of the rubber component.

Also, the rubber composition for a tire of the present invention preferably contains a silane coupling agent.

Also, the present invention is a tread composed of any one of the above rubber composition for a tire.

Also, the present invention is a side wall composed of any one of the above rubber composition for a tire.

Also, the present invention is a clinch composed of any one of the above rubber composition for a tire.

Further, the present invention is a tire obtained by using at least one type selected from the group consisting of the above tread, side wall and clinch.

Also, the present invention is a rubber composition for a base tread used to form a base tread of a tire, wherein the rubber composition for a base tread includes a rubber component composed of a diene based rubber, silica in an amount 20 parts by mass or more and 70 parts by mass or less based on 100 parts by mass of the rubber component composed of a diene based rubber and a natural based wax contained in an amount of 2 parts by mass or more and 15 parts by mass or less based on 100 parts by mass of the rubber component composed of the diene based rubber.

Here, in the rubber composition for a base tread of the present invention, the natural based wax is preferably carnauba wax.

Also, in the rubber composition for a base tread of the present invention, carbon black may be contained 5 parts by mass or less based on 100 parts by mass of the rubber component consisting of a diene based rubber.

Also, the rubber composition for a base tread preferably contains a silane coupling agent.

Also, the present invention is a base tread formed from any one of the above rubber composition for a base treads.

Also, the present invention is a tire obtained by using the above base tread.

Effects Of The Invention

According to the present invention, a rubber composition for a tire can be provided which can reduce the used amount of components derived from petroleum resources and is superior in ozone resistance and anti-blooming characteristics, and also, a tire member and a tire using this composition can be provided.

According to the present invention, a rubber composition for a base tread which can reduce the used amount of components derived from petroleum resources and can attain high ozone resistance required for tires and low fuel consumption of vehicles, and also, a base tread and a tire obtained by using this rubber composition for a base tread can be provided.

DESCRIPTION OF THE REFERENCE SIGNS

Figure 1:
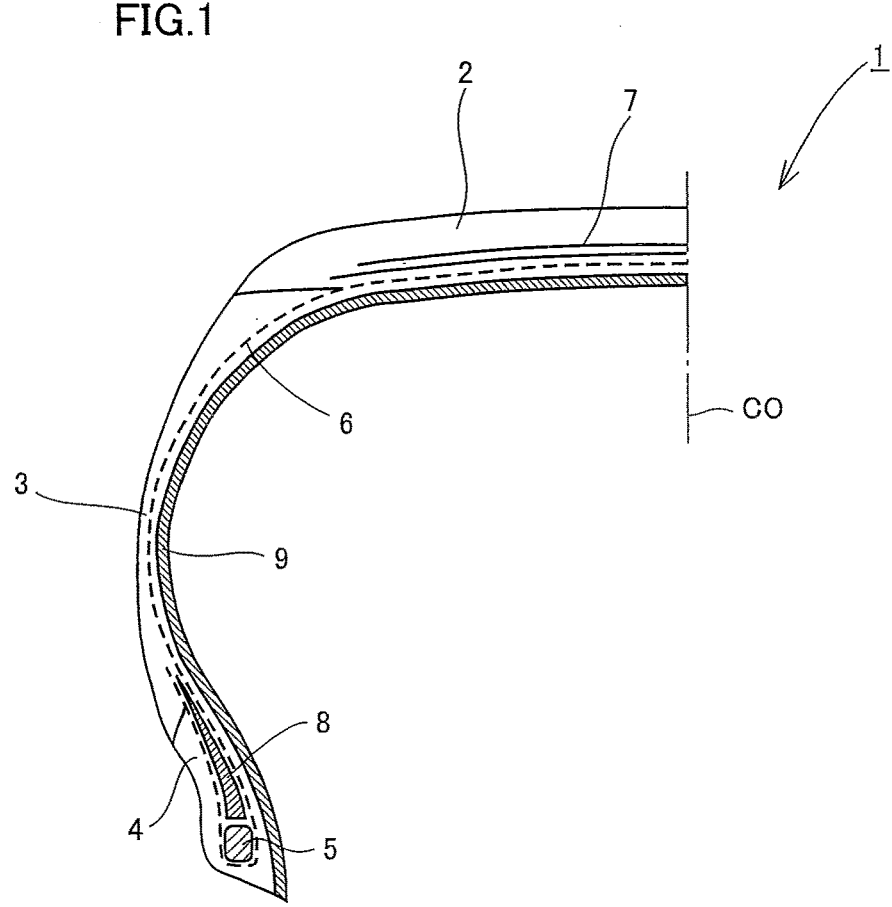
FIG. 1 is a schematic sectional view of the upper half left part of an example of a tire obtained by using a rubber composition for a tire according to the present invention.

1 and 11 are a tire, 2 is a tread, 3 and 13 are a side wall, 4 and 14 are a clinch, 5 and 15 are a bead core, 6 and 16 are a ply, 7 and 17 are a belt, 8 and 18 are a bead apex, 9 and 19 are an inner liner, 12a is a cap tread, and 12b is a base tread.

BEST MODES FOR CARRYING OUT THE INVENTION

Embodiments of the present invention will be described below. In these drawings of the present invention, the same reference symbols represent the same parts or corresponding parts.

<Rubber Component in the Rubber Composition for a Tire>

In the rubber composition for a tire of the present invention, such as one rubber among natural rubbers or epoxidized natural rubbers or a mixed rubber prepared by mixing a natural rubber and an epoxidized natural rubber is used as the rubber component.

The used amount of components derived from petroleum resources can be reduced by using a rubber component containing at least one of a natural rubber and an epoxidized rubber as the rubber component.

Here, as the natural rubber, a conventionally known one may be used. A usual one, for example, KR7, RSS or TSR in tire industries may be used.

As the epoxidized natural rubber, a conventionally known one may be used. For example, a commercially available epoxidized natural rubber or a rubber obtained by epoxidizing a natural rubber may be used.

Here, as the commercially available epoxidized natural rubber, products available from Kumplan Guthrie Berhad, such as ENR 25 which is a epoxidized ratio of 25% and ENR 50 which is a epoxidized ratio of 50% may be used.

As a method of epoxidizing a natural rubber, the chlorohydrin method, direct oxidizing method, alkylhydroperoxide method or peroxide method may be used. Here, as the peroxide method, a method in which a natural rubber is reacted with an organic peracid such as peracetic acid or performic acid may be used.

Here, when the rubber composition for a tire of the present invention is used to form a tread and/or a side wall, the epoxidation ratio of an epoxidized natural rubber is preferably 5 mol % or more and more preferably 10 mol % or more. When the epoxidation ratio is 5 mol % or more and particularly, 10 mol % or more, the grip performance of a tread obtained by using the rubber composition for a tire of the present invention is improved and the crack growth resistance of a side wall obtained by using the rubber composition for a tire of the present invention tends to be better.

Also, the epoxidation ratio of an epoxidized natural rubber is preferably 60 mol % or less and more preferably 55 mol % or less. When the epoxidation ratio is 60 mol % or less and particularly 55 mol % or less, reversion tends to decrease.

Here, the epoxidation ratio means the ratio (mol %) of the number of epoxidized double bonds in the rubber based on the total number of double bonds in the rubber before epoxidized.

Also, when a side wall is formed using the rubber composition for a tire of the present invention which uses, as the rubber component, mixed rubber obtained by mixing both a natural rubber and an epoxidized natural rubber, the content of the natural rubber is preferably 20% by mass or more and more preferably 25% by mass or more based on the rubber component composed of the natural rubber and epoxidized natural rubber. When the content of the natural rubber is 20% by mass or more and particularly 25% by mass or more of the rubber component, the crack growth resistance of a side wall produced using the rubber composition for a tire of the present invention tends to be better.

In the present invention, at least one of other rubbers such as butadiene rubber (BR), styrene butadiene rubber (SBR), isoprene rubber (IR) and butyl rubber (IIR) may be contained in the rubber component as long as at least one of the natural rubber and the epoxidized natural rubber is contained.

<Silica in the Rubber Composition for a Tire>

In the rubber composition for a tire of the present invention, silica is contained in an amount of 10 parts by mass or more based on 100 parts by mass of the above rubber component. Such a constitution can reduce the amount of carbon black to be used as a filler, and it is therefore possible not only to reduce the used amount of components derived from petroleum resources but also to obtain sufficient reinforcing effect of silica. As the silica, a conventionally known one may be used and for example, silica anhydride and/or hydrated silica or the like may be used.

The content of silica is preferably 15 parts by mass or more and more preferably 20 parts by mass or more based on 100 parts by mass of the above rubber component from the viewpoint of improving the reinforcing ability.

In addition, the content of silica is preferably 110 parts by mass or less and more preferably 100 parts by mass or less based on 100 parts by mass of the above rubber component from the viewpoint of improving the processability.

<Natural Based Wax in the Rubber Composition for a Tire>

In the rubber composition for a tire of the present invention, natural based wax is contained in an amount of 1.2% by mass or more and less than 2% by mass based on the total mass of the rubber composition for a tire of the present invention. This ensures that since sufficient ozone resistance and anti-blooming characteristics are obtained in a tire member produced using the rubber composition for a tire of the present invention and also, the used amount of wax prepared using petroleum as a raw material can be reduced, which means that the used amount of raw materials derived from petroleum resources can be reduced.

When the amount of the natural based wax is less than 1.2% by mass based on the total mass of the rubber composition for a tire of the present invention, the ozone resistance is insufficient and when the amount of the natural based wax exceeds 2% by mass based on the total mass of the rubber composition for a tire of the present invention, the rubber composition is changed in a white color.

Here, as the natural based wax, any wax using no petroleum as its raw material can be used without any particular limitation. Among these waxes, at least one type selected from the group of carnauba wax, candelilla wax, rice wax and Japan wax is preferably used.

As the carnauba wax, a conventionally known one can be used and, for example, wax prepared using leaves of plants belonging to Palmae which come from the north Brazil district can be used.

Also, as the candelilla wax, a conventionally known one can be used and, for example, one extracted from candelilla flowers which grow up in the Mexican Plateau can be used.

Also, as the rice wax, a conventionally known one can be used and, for example, one separated from rice bran oil obtained when the rice bran oil extracted from rice bran is refined can be used.

Also, as the Japan wax, a conventionally known one can be used and, for example, one extracted from a seed of a Japanese wax tree can be used.

The content of the natural based wax is preferably 1.3% by mass or more based on the total mass of the rubber composition for a tire of the present invention.

Also, the content of the natural based wax is preferably 1.9% by mass or less based on the total mass of the rubber composition for a tire of the present invention.

<Silane Coupling Agent in the Rubber Composition for a Tire>

Also, the rubber composition for a tire of the present invention preferably contains a silane coupling agent. Here, as the silane coupling agent, a conventionally known one may be used. Examples of the silane coupling agent include sulfide based such as bis(3-triethoxysilylpropyl)tetrasulfide, bis(2-triethoxysilylethyl)tetrasulfide, bis(3-trimethoxysilylpropyl)tetrasulfide, bis(2-trimethoxysilylethyl)tetrasulfide, bis(3-triethoxysilylpropyl)trisulfide, bis(3-triethoxysilylpropyl)trisulfide, bis(3-triethoxysilylpropyl)disulfide, bis(3-trimethoxysilylpropyl)disulfide, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 2-trimethoxysilylethyl-N,N-dimethylthiocarbamoyltetrasulfide, 3-trimethoxysilylpropylbenzothiazolyltetrasulfide, 3-triethoxysilylpropylbenzothiazoltetrasulfide, 3-triethoxysilylpropylmethacrylatemonosulfide and 3-trimethoxysilylpropylmethacrylatemonosulfide, mercapto based such as 3-mercaptopropyltrimethoxysilane, 3-mercaptopropyltriethovsilane, 2-mercaptoethyltrimethoxysilane and 2-mercaptoethyltriethoxysilane, vinyl based such as vinyltriethoxysilane and vinyltrimethoxysilane, amino based such as 3-aminopropyltriethorysilane, 3-aminopropyltrimethoxysilane, 3-(2-aminoethyl)aminopropyltriethoxysilane and 3-(2-aminoethyl)aminopropyltrimethoxysilane, glycidoxy based such as γ-glycidoxypropyltriethoxysilane, γ-glycidoxypropyltrimethoxysilane, γ-glycidoxypropylmethyldiethoxysilane and γ-glycidoxypropylmethyldimethoxysilane, nitro based such as 3-nitropropyltrimethoxysilane and 3-nitropropyltriethoxysilane and chloro based such as 3-chloropropyltrimethoxysilane, 3-chloropropyltriethoxysilane, 2-chloroethyltrimethoxysilane and 2-chloroethyltriethoxysilane. The above silane coupling agents can be used either singly or in combinations of two or more kinds.

The content of the silane coupling agent is preferably 4 parts by mass or more and more preferably 8 parts by mass or more based on 100 parts by mass of silica. When the content of the silane coupling agent is 4 parts by mass or more and particularly 8 parts by mass or more based on 100 parts by mass of silica, the processability and dispersibility of silica tend to be better.

<Carbon Black in the Rubber Composition for a Tire>

Though the rubber composition for a tire of the present invention may contain conventionally known carbon black derived from petroleum resources, the content of carbon black is preferably 5 parts by mass or less based on 100 parts by mass of the above rubber component and it is more preferable that carbon black is not contained at all from the viewpoint of reducing the used amount of components derived from petroleum resources.

Also, as carbon black, conventionally known carbon black such as SAF, ISAF, HAF or FEF can be used.

<Other Components in the Rubber Composition for a Tire>

The rubber composition for a tire of the present invention may be properly blended with, besides the above components, various components such as an antioxidant, stearic acid, zinc oxide, oil, sulfur or a vulcanization accelerator which are usually used in tire industries.

As the antioxidant, a conventionally known one can be used and, for example, an antioxidant such as a phenol based, imidazole based or metal carbamate can be used.

As the stearic acid, a conventionally known one can be used and, for example, stearic acid manufactured by Nippon Oil & Fats Co., Ltd. can be used.

As the zinc oxide, a conventionally known one can be used and, for example, zinc white No. 1 manufactured by Mitsui Mining & Smelting Co., Ltd. can be used.

As the oil, a conventionally known one can be used and, for example, process oil, vegetable oil and fats or a mixture thereof can be used. As the process oil, for example, paraffinic process oil, naphthenic process oil or aromatic process oil can be used. As the vegetable oil and fats, for example, castor oil, cotton seed oil, linseed oil, rape seed oil, soybean oil, palm oil, coconut oil, peanut oil, rosin, pine oil, pine tar, tall oil, corn oil, rice oil, safflower oil, sesame oil, olive oil, sunflower oil, palm kernel oil, camellia oil, jojoba oil, macadamia nut oil, safflower oil or paulownia oil can be used.

As the above sulfur, a conventionally known one can be used and, for example, powdery sulfur manufactured by Tsurumi Chemical can be used.

As the above vulcanization accelerator, a conventionally known one can be used and, for example, a material containing at least one of sulfenamide based, thiazole based, thiuram based, thiourea based, guanidine based, dithiocarbatnic acid based, aldehyde-amine based or aldehyde-ammonia based, imidazoline based and xanthate based vulcanization accelerators can be used. As the sulfenamide based, a sulfenamide based compound such as CBS(N-cyclohexyl-2-benzothiazylsulfenamide), TBBS (N-tert-butyl-2-benzothiazylsulfenamide), N,N-dicyclohexyl-2-benzothiazylsulfenamide, N-oxydiethylene-2-benzothiazylsulfenamide and N,N-diisopropy-2-benzothiazolsulfenamide can be used. As the thiazole based, a thiazole based compound, for example, MBT (2-mercaptobenzothiazole), MBTS (dibenzothiazylsulfide), sodium salts, zinc salts, copper salts or cyclohexylamine salts of 2-mercaptobenzothiazole, 2-(2,4-dinitrophenyl)mercapto-benzothiazole or 2-(2,6-diethyl-4-morpholinothio)benzothiazole can be used. As the thiuram based, a thiuram based compound, for example, TMTD (tetramethylthiuram disulfide), tetraethylthiuram disulfide, tetramethylthiuram monosulfide, dipentamethylenethiuram disulfide, dipentamethylenethiuram monosulfide, dipentamethylenethiuram tetrasulfide, dipentamethylenethiuram hexasulfide, tetrabutylthiuram disulfide or pentamethylenethiuram tetrasulfide can be used. As the thiourea based, a thiourea compound, for example, thiacarbamide, diethylthiourea, dibutylthiourea, trimethylthiourea or diorthotolylthiourea can be used. As the guanidine based, a guanidine based compound, for example, diphenylguanidine, diorthotolylguanidine, triphenylguanidine, orthotolylbiguanide or diphenylguanidine phthalate can be used. As the dithiocarbamic acid based, a dithiocarbamic acid based compound, for example, zinc ethylphenyldithiocarbamate, zinc butylphenyldithiocarbamate, sodium dimethyldithiocarbamate, zinc dimethyldithiocarbamate, zinc diethyldithiocarbamate, zinc dibutyldithiocarbamate, zinc diamyldithiocarabamate, zinc dipropyldithiocarbamate, a complex salt of zinc pentamethylenedithiocarbamate and piperidine, zinc hexadecyl (or octadecyl)isopropyldithiocarbamate, zinc dibenzyldithiocarbamate, sodium diethyldithiocarbamate, piperidine pentamethylenedithiocarbamate, selenium dimethyldithiocarbamate, tellurium diethyldithiocarbamate or cadmium diamyldithiocarbamate can be used. As the aldehyde-amine based or aldehyde-ammonia based, an aldehyde-amine based or aldehyde-ammonia based compound, for example, acetaldehyde-aniline reaction products, butyl aldehyde-aniline condensed compounds, hexamethylenetetramine or acetaldehyde-ammonia reaction products can be used. As the imidazoline based, an imidazoline based compound, for example, 2-mercaptoimidazoline can be used. As the xantate based, a xantate based compound such as zinc dibutylxanthogenate can be used. These vulcanization accelerators may be used either singly or in combinations of two or more.

<Tire Produced Using the Rubber Composition for a Tire>

The above rubber composition for a tire of the present invention is processed into a prescribed shape in a non-vulcanized state by extrusion processing or the like, thereby forming a tread, a side wall or a clinch. Then, these tire members are arranged at each defined position to manufacture a green tire, and then, the rubber composition constituting each member of the green tire is, for example, vulcanized to produce a tire according to the present invention.

FIG. 1 is a typical sectional view of the upper half left part of an example of a tire produced using the rubber composition for a tire of the present invention. Here, a tire 1 is provided with a tread 2 which is to be the ground plane of tire 1, a pair of side walls 3 extending inwardly in the radial direction of the tire from both ends of tread 2 to constitute each side of tire 1 and a bead core 5 positioned inside end of each side wall 3. Also, a ply 6 is crosslinked between bead cores 5 and 5 and a belt 7 having a hoop effect and reinforcing the tread 2 is provided outside of ply 6 and inside of tread 2.

Ply 6 can be formed from a rubber sheet in which a plurality of cords forming an angle of, for example, 70° to 90° relevant to the tire equatorial CO (virtual line obtained by making one revolution round to the circumferential direction of the circumference of tire 1 along the center of the width of the circumference of tire 1) are embedded in the rubber composition. Also, ply 6 is extended from tread 2 through side wall 3 to bead core 5 around which it is turned up from the inside to the outside in the direction of the tire axis to anchor it.

Belt 7 can be formed, for example, from a rubber sheet in which a plurality of cords forming an angle of, for example 40° or less relative to the tire equatorial CO are embedded in the rubber composition.

Also, tire 1 may be provided with a band (not shown) that prevents the peeling of belt 7, if necessary. Here, the band may be formed of a rubber sheet with a plurality of cords embedded in the rubber composition and may be provided by winding it spirally outside of belt 7 in almost parallel to the tire equatorial CO.

Also, tire 1 is formed with a bead apex 8 extending outward from the bead core 5 in the radial direction of tire and an inner liner 9 is disposed inside of ply 6. The outside of the folded part of ply 6 is coated with side wall 3 and with a clinch 4 extending inwardly in the direction of the radial direction of tire from the side wall 3.

Tire 1 shown in FIG. 1 is a tire for passenger cars. However, the present invention is not limited to this and may be applied to various tires for passenger cars, trucks, buses and heavy cars.

Tire 1 having the above constitution can be made to be a tire superior in ozone resistance and anti-blooming characteristics because tread 2, side wall 3 and clinch 4 are formed using the rubber composition for a tire of the present invention.

Also, since tire 1 having the above constitution can be reduced the used amount of components derived from petroleum resources and can be therefore an ecological tire which can be taking an environment into consideration and also can cope with a reduction in the amount of petroleum to be supplied in the future.

In the above descriptions, tread 2, side wall 3 and clinch 4 are formed from the rubber composition for a tire of the present invention. However, in the present invention, it is only required that at least a part of the outside peripheral surface of tire 1 is formed from the rubber composition for a tire of the present invention and, for example, at least one type selected from the group consisting of tread 2, side wall 3 and clinch 4 can be formed from the rubber composition for a tire of the present invention.

It is needless to say that parts other than the tread 2, side wall 3 and clinch 4 in the tire are preferably formed using components other than the components derived from petroleum resources as much as possible from the viewpoint of reducing the used amount of the components derived from petroleum resources. Also, when the rubber composition for a tire of the present invention is used to produce tread 2, at least one of a cap tread which is a tread part disposed on the outside in the radial direction of tire 1 and a base tread which is a tread part disposed on the inside in the radial direction of tire 1 may be formed.

<Rubber Composition for a Base Tread>

The inventors of the present invention have made earnest studies to obtain a tire having excellent ozone resistance while reducing the used amount of components derived from petroleum resources in case of the exhaustion of petroleum in the future, and as a result, found that an excellent ozone resistance is provided to a tire and low fuel consumption characteristics are provided to vehicles by compounding a fixed amount of silica as a filler and a fixed amount of natural based wax in the rubber composition composed of a diene based rubber, to complete the rubber composition for a base tread of the present invention.

<Rubber Component in the Rubber Composition for a Base Tread>

In the present invention, conventionally known diene based rubbers can be used either singly or in combinations of two or more as the rubber component composed of a diene based rubber. For example, at least one diene based rubber selected from the group of natural rubber (NR), styrene butadiene rubber (SBR) and butadiene rubber (BR) can be used.

Here, as the natural rubber (NR), a conventionally known one can be used and for example, natural rubber (NR), for example, KR7, RSS, TSR or SIR20 which is usually used in tire industries can be used. Also, conventionally known ones can be used as the styrene butadiene rubber (SBR) and butadiene rubber (BR) respectively.

<Silica in the Rubber Composition for a Base Tread>

The rubber composition for a base tread according to the present invention contains silica in an amount of 20 parts by mass or more and 70 parts by mass or less based on 100 parts by mass of the rubber component composed of the above diene based rubber. Such a constitution ensures that the used amount of carbon black to be used as a filler can be decreased, so that the used amount of components derived from petroleum resources can be decreased, also, sufficient reinforcing effect of silica can be obtained and also, vehicles having low fuel consumption can be attained.

Specifically, when the amount of silica to be compounded is less than 20 parts by mass based on 100 parts by mass of the rubber component composed of the above diene based rubber, the amount of silica to be compounded is so small that the reinforcing effect of silica is not obtained. On the other hand, when the amount of silica to be compounded exceeds 70 parts by mass based on 100 parts by mass of the rubber component constituted of the above diene based rubber, the amount of silica to be compounded is so large that, for example, a rolling resistance is increased and therefore, a reduction in the fuel consumption of vehicles cannot be attained.

The content of silica is preferably 20 parts by mass or more and more preferably 35 parts by mass or more based on 100 parts by mass of the rubber component composed of the above diene based rubber from the viewpoint of reinforcing the rubber to secure the durability of the tire satisfactorily.

The content of silica is preferably 70 parts by mass or less and more preferably 55 parts by mass or less based on 100 parts by mass of the rubber component composed of the above diene based rubber from the viewpoint of securing low exothermic properties enough to sufficiently reduce the rolling resistance of the tire.

Also, the nitrogen adsorption specific surface area (hereinafter referred to as "BET specific surface area") of silica measured by the BET method is preferably 95 $m^2/g$ or more and more preferably 110 $m^2/g$ or more. When the BET specific surface area of silica is less than 110 $m^2/g$ and particularly less than 95 $m^2/g$, insufficient rubber reinforcing ability is obtained and this tends to be a cause of impaired durability of the tire.

Also, the BET specific surface area of silica is preferably 260 $m^2/g$ or less and more preferably 220 $m^2/g$ or less. When BET of silica is more than 220 $m^2/g$ and particularly more than 260 $m^2/g$, there is a tendency that for example, the Mooney viscosity is increased, so that the processability of the rubber composition for a base tread of the present invention is impaired and the effect of reducing the rolling resistance of the tire is decreased.

As silica, a conventionally known one can be used and, for example, silica anhydride and/or hydrate silica or the like may be used.

<Natural Based Wax in the Rubber Composition for a Base Tread>

The rubber composition for a base tread of the present invention contains natural based wax in an amount of 2 parts by mass or more and 15 parts by mass or less based on 100 parts by mass of the above diene based rubber. This ensures that the amount of components derived from petroleum resources can be reduced, the tire using a base tread formed using the rubber composition for a base tread of the present invention develops excellent ozone resistance and the strength (rupture strength) of the base tread after vulcanized is made high.

Specifically, when the content of the above natural based wax is less than 2 parts by mass based on 100 parts by mass of the rubber component composed of the above diene based rubber, the amount of the natural based wax to be compounded is too small and the ozone resistance of the tire is inferior whereas when the amount of the natural based wax exceeds 15 parts by mass, the rupture strength of the base tread manufactured by vulcanizing the rubber composition for a base tread according to the present invention is low.

It is usually estimated that wax is moved in rubber by concentration gradient. Wax precipitates on the surface of the cap tread of the tire to develop ozone resistance. The wax that precipitates on the surface of the cap tread falls off caused by the abrasion of the tire when the tire is running and by rainy weather when the vehicles are stored and by washing of vehicles, which makes the wax lose its effect. This falling-off of the wax causes the concentration gradient of wax between the inside and surface of the tread rubber, so that the wax compounded inside of the tire moves successively to the surface to exhibit ozone resistance continuously. Finally, all the wax compounded in advance falls off, resulting in loss of the ozone resistance of the wax.

It has been found so far that, at this time, the moving speed of the wax to the cap tread from the base tread can be made slower than in the case of petroleum wax prepared from a petroleum raw material by compounding carnauba wax as the natural based wax in the rubber composition for a base tread forming the base tread. In other words, the movement of the wax to the surface from the inside of the tire can be continued for a longer time, making possible to continue the ozone resistance effect of the tire for a long time.

Therefore, from the above reason, it is preferable to use carnauba wax as the above natural based wax. As the carnauba wax, conventionally carnauba wax can be used.

Here, the content of carnauba wax is preferably 2 parts by mass or more and 15 parts by mass or less and more preferably 5 parts by mass or more and 10 parts by mass or less based on 100 parts by mass of the rubber component composed of the above diene based rubber. When the content of carnauba wax is less than 2 parts by mass based on 100 parts by mass of the rubber component composed of the above diene based rubber, there is a tendency that insufficient ozone resistance is obtained, whereas when the content exceeds 15 parts by mass, there is a tendency that this brings about a significant rise in production cost and inferior strength of the rubber after the rubber is vulcanized.

<Silane Coupling Agent in the Rubber Composition for a Base Tread>

Also, the rubber composition for a base tread of the present invention preferably contains a silane coupling agent. Here, as the silane coupling agent, a conventionally known one can be used. Examples of the silane coupling agent include sulfide based such as bis(3-triethoxysilylpropyl)tetrasulfide, bis(2-triethoxysilylethyl)tetrasulfide, bis(3-trimethoxysilylpropyl) tetrasulfide, bis(2-trimethoxysilylethyl)tetrasulfide, bis(3-triethoxysilylpropyl)trisulfide, bis(3-trimethoxysilylpropyl) trisulfide, bis(3-triethoxysilylpropyl)disulfide, bis(3-trimethoxysilylpropyl)disulfide, 3-trimethoxysilylpropyl-N, N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 2-trimethoxysilylethyl-N,N-dimethylthiocarbamoyltetrasulfide, 3-trimethoxysilylpropylbenzothiazolyltetrasulfide, 3-triethoxysilylpropylbenzothiazoltetrasulfide, 3-triethoxysilylpropylmethacrylatemonosulfide and 3-trimethoxysilylpropylmethacrylatemonosulfide, mercapto based such as 3-mercaptopropyltrimethoxysilane, 3-mercaptopropyltriethoxysilane, 2-mercaptoethyltrimethoxysilane and 2-mercaptoethyltriethoxysilane, vinyl based such as vinyltriethoxysilane and vinyltrimethoxysilane, amino based such as 3-aminopropyltriethoxysilane, 3-aminopropyltrimethoxysilane, 3-(2-aminoethypaminopropyltriethoxysilane and 3-(2-aminoethyl)aminopropyltrimethoxysilane, glycidoxy based such as γ-glycidoxypropyltriethoxysilane, γ-glycidoxypropyltrimethoxysilane, γ-glycidoxypropylmethyldiethoxysilane and γ-glycidoxypropylmethyldimethoxysilane, nitro based such as 3-nitropropyltrimethoxysilane and 3-nitropropyltriethoxysilane and chloro based such as 3-chloropropyltrimethoxysilane, 3-chloropropyltriethoxysilane, 2-chloroethyltrimethoxysilane and 2-chloroethyltriethoxysilane. The above silane coupling agents may be used either singly or in combinations of two or more kinds.

The content of the silane coupling agent is preferably 4 parts by mass or more and more preferably 8 parts by mass or more based on 100 parts by mass of silica. When the content of the silane coupling agent is 4 parts by mass or more and particularly 8 parts by mass or more based on 100 parts by mass of silica, chemical bonds are formed between silica and the silane coupling agent and there is a tendency that the ability of reinforcing the rubber can be secured sufficiently.

<Carbon Black in the Rubber Composition for a Base Tread>

Though the rubber composition for a base tread according to the present invention may contain conventionally known carbon black derived from petroleum resources, the content of carbon black is preferably 25 parts by mass or less and more preferably 5 parts by mass or less based on 100 parts by mass of the above diene based rubber and it is more preferable that carbon black be not contained at all from the viewpoint of reducing the amount of components derived from petroleum resources.

Also, as carbon black, conventionally known carbon black such as SAF, ISAF, HAF or FEF can be used.

<Other Components in the Rubber Composition for a Base Tread>

The rubber composition for a base tread according to the present invention may be properly blended with, besides the above components, various components such as an antioxidant, oil, stearic acid, zinc oxide, sulfur or a vulcanization accelerator which are usually used in tire industries.

As the above antioxidant, a conventionally known one can be used and, for example, an antioxidant such as an amine based, phenol based, imidazole based or metal carbamate can be used.

As the above oil, a conventionally known one can be used and, for example, process oil, vegetable oil and fats or a mixture thereof can be used. As the process oil, paraffinic process oil, naphthenic process oil or aromatic process oil can be used. As the vegetable oil and fats, for example, castor oil, cotton seed oil, linseed oil, rape seed oil, soybean oil, palm oil, coconut oil, peanut oil, rosin, pine oil, pine tar, tall oil, corn oil, rice oil, safflower oil, sesame oil, olive oil, sunflower oil, palm kernel oil, camellia oil, jojoba oil, macadamia nut oil, safflower oil or paulownia oil can be used.

As the stearic acid, a conventionally known one can be used and, for example, stearic acid manufactured by Nippon Oil & Fats Co., Ltd. can be used.

As the zinc oxide, a conventionally known one can be used and, for example, zinc white manufactured by Mitsui Mining & Smelting Co., Ltd. can be used.

As the above sulfur, a conventionally known one can be used and, for example, powdery sulfur manufactured by Tsurumi Chemical can be used.

As the vulcanization accelerator, a conventionally known one can be used and, for example, a material containing at least one of sulfenamide based, thiazole based, thiuram based, thiourea based, guanidine based, dithiocarbamic acid based, aldehyde-amine based or aldehyde-ammonia based, imidazoline based and xanthate based vulcanization accelerators can be used. As the sulfenamide based, a sulfenamide based compound such as CBS(N-cyclohexyl-2-benzothiazylsulfenamide), TBBS (N-tert-butyl-2-benzothiazylsulfenamide), N,N-dicyclohexyl-2-benzothiazylsulfenamide, N-oxydiethylene-2-benzothiazylsulfenamide and N,N-diisopropyl-2-benzothiazolsulfenamide can be used. As the thiazole based, a thiazole based compound, for example, MBT (2-mercaptobenzothiazole), MBTS (dibenzothiazylsulfide), sodium salts, zinc salts, copper salts or cyclohexylamine salts of 2-mercaptobenzothiazole, 2-(2,4-dinitrophenyl)mercapto-benzothiazole or 2-2,6-diethy1-4-morpholinothio)benzothiazole can be used. As the thiuram based, for example, a thiuram based compound, for example, TMTD (tetramethylthiuram disulfide), tetraethylthiuram disulfide, tetramethylthiuram monosulfide, dipentamethylenethiuram disulfide, dipentamethylenethiuram monosulfide, dipentamethylenethiuram tetrasulfide, dipentamethylenethiuram hexasulfide, tetrabutylthiuram disulfide or pentamethylenethiuram tetrasulfide can be used. As the thiourea based, a thiourea compound, for example, thiacarbamide, diethylthiourea, dibutylthiourea, trimethylthiourea or diorthotolylthiourea can be used. As the guanidine based, a guanidine based compound, for example, diphenylguanidine, diorthotolylguanidine, triphenylguanidine, orthotolylbiguanide or diphenylguanidine phthalate can be used. As the dithiocarbamic acid based, a dithiocarbamic acid based compound, for example, zinc ethylphenyldithiocarbamate, zinc butylphenyldithiocarbamate, sodium dimethyldithiocarbamate, zinc dimethyldithiocarbamate, zinc diethyldithiocarbamate, zinc dibutyldithiocarbamate, zinc diamyldithiocarabamate, zinc dipropyldithiocarbamate, a complex salt of zinc pentamethylenedithiocarbamate and piperidine, zinc hexadecyl (or octadecyl)isopropyldithiocarbamate, zinc dibenzyldithiocarbamate, sodium diethyldithiocarbamate, piperidine pentamethylenedithiocarbamate, selenium dimethyldithiocarbamate, tellurium diethyldithiocarbamate or cadmium diamyldithiocarbamate can be used. As the aldehyde-amine based or aldehyde-ammonia based, an aldehyde-amine based or aldehyde-ammonia based compound, for example, acetaldehyde-aniline reaction products, butyl aldehyde-aniline condensed compounds, hexamethylenetetramine or acetaldehyde-ammonia reaction products can be used. As the imidazoline based, an imidazoline based compound, for example, 2-mercaptoimidazoline can be used. As the xantate based, a xantate based compound such as zinc dibutylxanthogenate can be used. These vulcanization accelerators may be used either singly or in combinations of two or more.

<Tire Produced Using the Rubber Composition for a Base Tread>

The rubber composition for a base tread according to the present invention can be manufactured by mixing at least the rubber component composed of the above diene based rubber, silica and natural based wax by kneading.

The above rubber composition for a base tread according to the present invention is processed in a non-vulcanized state by extrusion processing or the like, thereby forming a base tread.

Then, these tire members including the base tread formed using the rubber composition for a base tread of the present invention are arranged at each defined position to manufacture a green tire, and then, the rubber composition constituting each member of the green tire is, for example, vulcanized to produce a tire according to the present invention.

Figure 2:
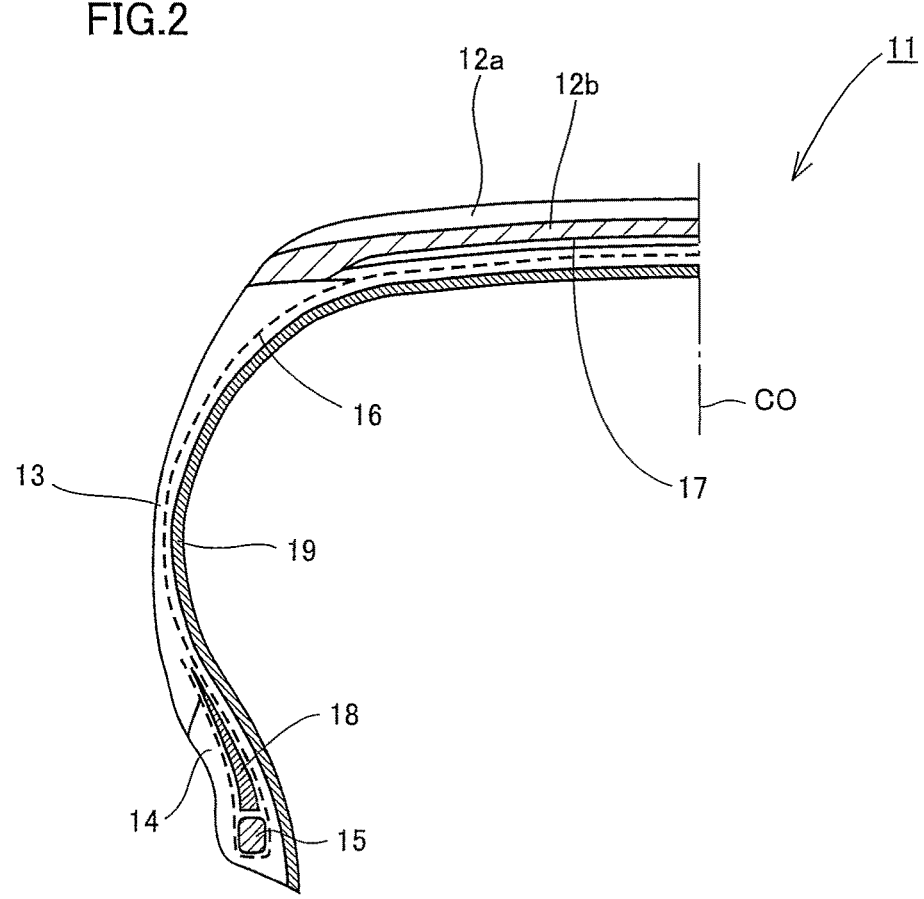
FIG. 2 is a schematic sectional view of the upper half left part of an example of a tire obtained by using a rubber composition for a base tread according to the present invention.

FIG. 2 is a typical sectional view of the upper half left part of an example of a tire produced using the rubber composition for a base tread of the present invention. Here, a tire 11 is provided with a cap tread 12a which is to be the ground plane of tire 11, a base tread 12b positioned on the inside of cap tread 12a in the radial direction of the tire, a pair of side walls 13 extending inwardly in the radial direction of the tire from both ends of base tread 12b to constitute each side of tire 11 and a bead core 15 positioned at the end in the tire radial direction of each side wall 13. Also, a ply 16 is crosslinked between the bead cores 15 and 15 and a belt 17 is provided outside of the ply 16 and inside of base tread 12b.

Ply 16 can be formed from a rubber sheet in which a plurality of cords forming an angle of for example 70° to 90° relevant to the tire equatorial CO (virtual line obtained by making one revolution round to the circumferential direction of the circumference of tire 11 along the center of the width of the circumference of the tire 11) are embedded in the rubber composition. Also, ply 16 extends from base tread 12b through side wall 13 to bead core 15 around which it is turned up from the inside to the outside in the direction of the tire axis to anchor it.

Belt 17 can be formed, for example, from a rubber sheet in which a plurality of cords forming an angle of, for example, 40° or less relative to the tire equatorial CO are embedded in the rubber composition.

Also, tire 11 may be provided with a band (not shown) that prevents the peeling of belt 17 if necessary. Here, the band may be formed of a rubber sheet with a plurality of cords embedded in the rubber composition and may be provided by winding it spirally outside of belt 17 in almost parallel to the tire equatorial CO.

Also, tire 11 is formed with a bead apex 18 extending outward from bead core 15 in the radial direction of the tire and an inner liner 19 is disposed inside of ply 16. The outside of the folded part of ply 16 is coated with side wall 13 and with a clinch 14 extending inward in the direction of the radial direction of the tire from side wall 13.

Tire 11 shown in FIG. 2 is a tire for passenger cars. However, the present invention is not limited to this and may be applied to various tires for passenger cars, trucks, buses and heavy cars.

In the rubber composition for a base tread of the present invention, silica and natural based wax such as carnauba wax having a slow moving speed in rubber are compounded in the rubber component composed of diene based rubber in the above appropriate amounts, respectively. When the rubber composition for a base tread of the present invention as mentioned above is used to form a base tread of a tire, excellent ozone resistance can be provided to the tire and vehicles equipped with the tires can be reduced in fuel consumption. Therefore, the rubber composition for a base tread of the present invention is preferably used in the formation of a base tread.

Also, since base tread 12b limited in the used amount of materials, such as carbon black, derived from petroleum resources is used in the tire 11 having the above constitution, it can be therefore an ecological tire which can be taking an environment into consideration and also can cope with a reduction in the amount of petroleum to be supplied in the future.

It is needless to say that parts other than the base tread 12b in the tire are preferably formed using components other than the components derived from petroleum resources as much as possible from the viewpoint of reducing the amount of components derived from petroleum resources.

EXAMPLE 1

According to the compounding shown in Table 1, components except for sulfur and a vulcanization accelerator were kneaded at 130° C. for 2 minutes by using a Banbury mixer to obtain a kneaded product. Next, sulfur and vulcanization accelerator were added to the kneaded product, which was then kneaded at 95° C. for 2 minutes by using an open roll to obtain an unvulcanized rubber composition. Then, the obtained unvulcanized rubber compositions were respectively vulcanized at 150° C. for 30 minutes to obtain vulcanized rubber sheets of Samples 1 to 15.

Each value shown in the columns of the components indicates the amount of each component to be compounded when the amount of the rubber component is defined as 100 parts by mass.

Also, the vulcanized rubber sheets of Samples 1 to 7 are formed with an intent on tread applications of a tire.

Also, the vulcanized rubber sheets of Samples 8 to 11 are formed with an intent on side wall applications of a tire.

Also, the vulcanized rubber sheets of Samples 12 to 15 are formed with an intent on clinch applications of a tire.

TABLE 1

|  |  | Tread | | | | | | |
|---|---|---|---|---|---|---|---|---|
|  |  | Sample 1 | Sample 2 | Sample 3 | Sample 4 | Sample 5 | Sample 6 | Sample 7 |
| Rubber | 9 Natural rubber(Note 1) | 30 | 30 | 30 | 30 | 30 | 30 | 30 |
|  | Epoxidized natural rubber(Note 2) | 70 | 70 | 70 | 70 | 70 | 70 | 70 |
| Other components | Carbon black(Note 3) | 2 | 2 | 2 | 2 | 2 | 2 | 2 |
|  | Silica(Note 4) | 75 | 75 | 75 | 75 | 75 | 75 | 75 |
|  | Silane coupling agent(Note 5) | 6 | 6 | 6 | 6 | 6 | 6 | 6 |
|  | Oil(Note 6) | 15 | 15 | 15 | 15 | 15 | 15 | 15 |
|  | Petroleum wax(Note 7) | 0 | 0 | 0 | 1.5 | 0 | 0 | 0 |
|  | Carnauba wax(Note 8) | 3 | 0 | 1.5 | 0 | 0 | 4.5 | 1.8 |
|  | Candelilla wax(Note 9) | 0 | 3 | 1.5 | 0 | 0 | 0 | 0 |
|  | Antioxidant(Note 10) | 2 | 2 | 2 | 2 | 2 | 2 | 2 |
|  | Stearic acid(Note 11) | 2 | 2 | 2 | 2 | 2 | 2 | 2 |
|  | Zinc oxide(Note 12) | 3 | 3 | 3 | 3 | 3 | 3 | 3 |
|  | Sulfur(Note 13) | 1.5 | 1.5 | 1.5 | 1.5 | 1.5 | 1.5 | 1.5 |
|  | Vulcanization accelerator(Note 14) | 2 | 2 | 2 | 2 | 2 | 2 | 2 |

TABLE 1-continued

| Evaluation | | Static ozone test | A | A | A | A | B | A | B |
|---|---|---|---|---|---|---|---|---|---|
| | | White-colored test | A | A | A | A | A | B | A |

| | | | Side wall | | | | Clinch | | | |
|---|---|---|---|---|---|---|---|---|---|---|
| | | | Sample 8 | Sample 9 | Sample 10 | Sample 11 | Sample 12 | Sample 13 | Sample 14 | Sample 15 |
| Rubber | Natural rubber[Note 1] | | 80 | 80 | 80 | 80 | 100 | 100 | 100 | 100 |
| | Epoxidized natural rubber[Note 2] | | 20 | 20 | 20 | 20 | 0 | 0 | 0 | 0 |
| Other components | Carbon black[Note 3] | | 2 | 2 | 2 | 2 | 2 | 2 | 2 | 2 |
| | Silica[Note 4] | | 45 | 45 | 45 | 45 | 60 | 60 | 60 | 60 |
| | Silane coupling agent[Note 5] | | 3.6 | 3.6 | 3.6 | 3.6 | 4.8 | 4.8 | 4.8 | 4.8 |
| | Oil[Note 6] | | 0 | 0 | 0 | 0 | 0 | 0 | 0 | 0 |
| | Petroleum wax[Note 7] | | 0 | 0 | 1.2 | 0 | 0 | 0 | 1.2 | 0 |
| | Carnauba wax[Note 8] | | 2.4 | 1.5 | 0 | 1.4 | 2.4 | 1.5 | 0 | 1.4 |
| | Candelilla wax[Note 9] | | 0 | 1.5 | 0 | 0 | 0 | 1.5 | 0 | 0 |
| | Antioxidant[Note 10] | | 2.4 | 2.4 | 2.4 | 2.4 | 2.4 | 2.4 | 2.4 | 2.4 |
| | Stearic acid[Note 11] | | 1 | 1 | 1 | 1 | 2 | 2 | 2 | 2 |
| | Zinc oxide[Note 12] | | 3 | 3 | 3 | 3 | 3 | 3 | 3 | 3 |
| | Sulfur[Note 13] | | 1 | 1 | 1 | 1 | 2 | 2 | 2 | 2 |
| | Vulcanization accelerator[Note 14] | | 2 | 2 | 2 | 2 | 2 | 2 | 2 | 2 |
| Evaluation | Static ozone test | | A | A | A | B | A | A | A | B |
| | White-colored test | | A | A | A | A | A | A | A | A |

[Note 1] Natural rubber: KR7, TSR
[Note 2] Epoxidized natural rubber: MRB (epoxidation ration: 50 mol%)
[Note 3] Carbon black: N220 (trade name, manufactured by Mitsubishi Chemical Co., Ltd.)
[Note 4] Silica: ZEOSIL-195GR (trade name, manufactured by Rhodia Japan (k.k.), BET specific surface area: 180 $m^2/g$), ZEOSIL-215GR (trade name, manufactured by Rhodia Japan (k.k.), BET specific surface area: 248 $m^2/g$)
[Note 5] Silane coupling agent: Si75 (trade name manufactured by Degussa)
[Note 6] Oil: Process 140 manufactured by Japan Energy
[Note 7] Petroleum wax: Sunnok Wax (trade name, manufactured by Ouchishinko Chemical Industry Ltd.)
[Note 8] Carnauba wax: Product manufactured by Toa Kasei (k.k.)
[Note 9] Candelilla wax: Product manufactured by Toa Kasei (k.k.)
[Note 10] Antioxidant: Nocrac 6C (N-1, 3-dimethylbutyl-N'-phenyl-p-phenylenediamine, manufactured by Ouchishinko Chemical Industry Ltd.)
[Note 11] Stearic acid: Product manufactured by Nippon Oil & Fats Co., Ltd.
[Note 12] Zinc oxide: zinc white No. 1 (trade name, manufactured by Mitsui Mining & Smelting Co., Ltd.)
[Note 13] Sulfur: Powder sulfur (manufactured by Tsurumi Chemical)
[Note 14] Vulcanization accelerator: Noccellor NS (trade name, manufactured by Ouchishinko Chemical Industry Ltd.)

The above petroleum waxes are waxes produced from petroleum and petroleum type waxes constituted of a wide range of components having 5 to 55 carbon atoms.

Also, the above carnauba wax is natural based wax extracted from leaves of plants belonging to Palmae which come from the north Brazil district and contains broad components having 28 to 38 carbon atoms and a sharp (high content) component having 50 carbon atoms.

Also, the above candelilla wax is natural based wax extracted from candelilla flowers which grow up in the Mexico plateau and contains a sharp component having 31 carbon atoms.

<Static Ozone Test>

Each vulcanized rubber sheet of Samples 1 to 15 obtained in the above manner was subjected to an outdoor exposure test made for 3 months in the state stretched by 20% and the surface of the vulcanized rubber sheet was observed visually to confirm whether some cracks were present or not. The results are shown in Table 1.

In the column of the static ozone test in Table 1, A shows that no crack is observed and B shows that some cracks are observed.

<White-Colored Test>

With regard to the surface of each vulcanized rubber sheet after the above static ozone test, whether or not the surface was colored in white by the transfer of wax to the surface was confirmed by observing visually. The results are shown in Table 1.

In the column of the white-colored test in Table 1, A shows that the surface is not whitened and B shows that the surface is whitened.

<Results>

(1) Tread Applications

As shown in Table 1, it was confirmed that the vulcanized rubber sheets of Samples 1 to 3 each manufactured by vulcanizing an unvulcanized rubber composition in which the content of natural based wax composed of carnauba wax and/or candelilla wax was 1.2% by mass or more and less than 2% by mass based on the total mass of the non-vulcanized rubber composition generated no crack in the static ozone test and were not also changed in surface color to white in the white-colored test.

On the other hand, the vulcanized rubber sheet of Sample 5 manufactured without using any natural based wax generated cracks in the static ozone test. It was therefore confirmed that the vulcanized rubber sheets of Samples 1 to 3 were each superior in ozone resistance to the vulcanized rubber sheet of Sample 5.

Also, the vulcanized rubber sheet of Sample 6 manufactured by vulcanizing an unvulcanized rubber composition in which the content of natural based wax was 2.1% by mass based on the total mass of the non-vulcanized rubber composition was changed in surface color to white in the white-colored test. It was therefore confirmed that the vulcanized rubber sheets of Samples 1 to 3 were each superior in anti-blooming characteristics of wax to the vulcanized rubber sheet of Sample 6.

Also, the vulcanized rubber sheet of Sample 7 manufactured by vulcanizing an unvulcanized rubber composition in which the content of natural based wax was 0.86% by mass based on the total mass of the non-vulcanized rubber composition generated cracks in the static ozone test. It was therefore confirmed that the vulcanized rubber sheets of Samples 1 to 3 were each superior in ozone resistance to the vulcanized rubber sheet of Sample 7.

In the case of the vulcanized rubber sheet of Sample 4, it was confirmed that no crack was generated in the static ozone test and the surface of the rubber sheet was not changed in color to white in the white-colored test. However, since petroleum type wax is compounded in the rubber sheet of Sample 4, the vulcanized rubber sheets of Samples 1 to 3 in which only natural based wax is compounded are each superior to the vulcanized rubber sheet of Sample 4 in the point that the used amount of components derived from petroleum resources is decreased.

(2) Side Wall Applications

As shown in Table 1, it was confirmed that the vulcanized rubber sheets of Samples 8 and 9 each manufactured by vulcanizing an unvulcanized rubber composition in which the content of natural based wax was 1.2% by mass or more and less than 2% by mass based on the total mass of the unvulcanized rubber composition generated no crack in the static ozone test and were not also changed in surface color to white in the white-colored test.

Also, the vulcanized rubber sheet of Sample 6 manufactured by vulcanizing an unvulcanized rubber composition in which the content of natural based wax was 2.1% by mass based on the total mass of the non-vulcanized rubber composition was changed in surface color to white in the white-colored test. It was therefore confirmed that the vulcanized rubber sheets of Samples 8 and 9 were each superior in anti-blooming characteristics of wax to the vulcanized rubber sheet of Sample 6.

In the case of the vulcanized rubber sheet of Sample 10, it was confirmed that no crack was generated in the static ozone test and the surface of the rubber sheet was not changed in color to white in the white-colored test. However, since petroleum type wax is compounded in the rubber sheet of Sample 10, the vulcanized rubber sheets of Samples 8 and 9 in which only natural based wax is compounded are each superior to the vulcanized rubber sheet of Sample 10 in the point that the used amount of components derived from petroleum resources is decreased.

(3) Clinch Applications

As shown in Table 1, it was confirmed that the vulcanized rubber sheets of Samples 12 and 13 each manufactured by vulcanizing an unvulcanized rubber composition in which the content of natural based wax was 1.2% by mass or more and less than 2% by mass based on the total mass of the non-vulcanized rubber composition generated no crack in the static ozone test and were not also changed in surface color to white in the white-colored test.

Also, the vulcanized rubber sheet of Sample 15 manufactured by vulcanizing an unvulcanized rubber composition in which the content of natural based wax was 0.78% by mass based on the total mass of the non-vulcanized rubber composition generated cracks in the static ozone test. It was therefore confirmed that the vulcanized rubber sheets of Samples 12 and 13 were each superior in ozone resistance to the vulcanized rubber sheet of Sample 15.

In the case of, the vulcanized rubber sheet of Sample 14, it was confirmed that no crack was generated in the static ozone test and the surface of the rubber sheet was not changed in color to white in the white-colored test. However, since petroleum type wax is compounded in the rubber sheet of Sample 14, the vulcanized rubber sheets of Samples 12 and 13 in which only natural based wax is compounded are each superior to the vulcanized rubber sheet of Sample 14 in the point that the used amount of components derived from petroleum resources is decreased.

(4) Conclusion

It was confirmed from the above results that the vulcanized rubber sheets each manufactured by vulcanizing an unvulcanized rubber composition in which the content of natural based wax was 1.2% by mass or more and less than 2% by mass based on the total mass of the non-vulcanized rubber composition were superior in ozone resistance and anti-blooming characteristics in response to rubber formulations in all of the tread applications, side wall applications and clinch applications.

EXAMPLE 2

<Production of an Unvulcanized Rubber Composition>

According to the formulation shown in Table 2, components except for sulfur and a vulcanization accelerator were kneaded by using a 1.7 L Banbury mixer in which the discharge temperature was set to 155° C., to obtain a kneaded product. Next, the aforementioned sulfur and vulcanization accelerator were added to the kneaded product, which was then kneaded at 90° C. for 2 minutes by using an open roll to obtain an unvulcanized rubber composition.

Each value shown in the columns of other components indicates the amount (parts by mass) of each component to be compounded when the amount of a diene based rubber which is a mixture of natural rubber (NR) and butadiene (BR) (Mass of NR: Mass of BR=40:60) is defined as 100 parts by mass.

TABLE 2

|  |  | Sample 16 | Sample 17 | Sample 18 | Sample 19 | Sample 20 | Sample 21 | Sample 22 | Sample 23 | Sample 24 | Sample 25 |
|---|---|---|---|---|---|---|---|---|---|---|---|
| Rubber | Natural rubber[Note 15] | 40 | 40 | 40 | 40 | 40 | 40 | 40 | 40 | 40 | 40 |
|  | Butadiene rubber[Note 16] | 60 | 60 | 60 | 60 | 60 | 60 | 60 | 60 | 60 | 60 |
| Other components | N339[Note 17] | 2 | 2 | 2 | 2 | 2 | 2 | 2 | 2 | 2 | 2 |
|  | Silica VN3[Note 18] | 50 | 50 | 50 | 20 | 70 | 50 | 50 | 50 | 10 | 80 |
|  | Silane coupling agent Si266[Note 19] | 4 | 4 | 4 | 1.6 | 5.6 | 4 | 4 | 4 | 1 | 6.4 |
|  | Carnauba wax[Note 20] | 5 | 10 | 15 | 15 | 10 | 0 | 0 | 18 | 10 | 10 |
|  | Petroleum type wax[Note 21] | 0 | 0 | 0 | 0 | 0 | 2 | 0 | 0 | 0 | 0 |
|  | Antioxidant 6PPD[Note 22] | 2 | 2 | 2 | 2 | 2 | 2 | 2 | 2 | 2 | 2 |
|  | Process oil[Note 23] | 8 | 8 | 8 | 0 | 28 | 8 | 8 | 8 | 8 | 38 |
|  | Stearic acid[Note 24] | 2 | 2 | 2 | 2 | 2 | 2 | 2 | 2 | 2 | 2 |
|  | Zinc oxide[Note 25] | 2 | 2 | 2 | 2 | 2 | 2 | 2 | 2 | 2 | 2 |
|  | Sulfur[Note 26] | 2 | 2 | 2 | 2 | 2 | 2 | 2 | 2 | 2 | 2 |
|  | Accelerator TBBS[Note 27] | 1.8 | 1.8 | 1.8 | 1.8 | 1.8 | 1.8 | 1.8 | 1.8 | 1.8 | 1.8 |

TABLE 2-continued

|  |  | Sample 16 | Sample 17 | Sample 18 | Sample 19 | Sample 20 | Sample 21 | Sample 22 | Sample 23 | Sample 24 | Sample 25 |
|---|---|---|---|---|---|---|---|---|---|---|---|
| Evaluation | Static ozone test (day) | 25 | 110 | >120 | >120 | >120 | 25 | 5 | >120 | >120 | >120 |
|  | Tensile strength (MPa) | 18.1 | 17.7 | 15.5 | 14.8 | 18.9 | 17.8 | 17.9 | 13.3 | 12.6 | 18.9 |
|  | Rolling resistance | 100 | 98 | 101 | 98 | 103 | 100 | 100 | 101 | 95 | 106 |

(Note 15)Natural rubber (NR): SIR20
(Note 16)Butadiene rubber (BR): Butadiene rubber manufactured by the Ube Industries Ltd.
(Note 17)Carbon black N339 (trade name, manufactured by Mitsubishi Chemical Co., Ltd.)
(note 18)Silica VN3: Silica (manufactured by Degussa, BET specific surface area: 175 m$^2$/g)
(Note 19)Silane coupling agent Si266: Silane coupling agent (manufactured by Degussa)
(Note 20)Carnauba wax: Product manufactured by Toa Kasei (k.k.)
(Note 21)Petroleum wax: Ozoace 0355 (trade name, manufactured by Nippon Seiro Co., Ltd.)
(Note 22)Antioxidant 6PPD: (manufactured by Sumitomo Chemical Co., Ltd.)
(Note 23)Process oil: Aroma oil (manufactured by JOMO)
(Note 24)Stearic acid: Camellia (manufactured by Nippon Oil & Fats Co., Ltd.)
(Note 25)Zinc oxide: (Manufactured by Mitsui Mining & Smelting Co., Ltd.)
(Note 26)Sulfur: (Manufactured by Tsurumi Chemical)
(Note 27)Accelerator TBBS: Vulcanization accelerator (manufactured by Ouchishinko Chemical Industry Ltd.)

<Static Ozone Test>

Each unvulcanized rubber sheet of Samples 16 to 25 obtained in the above manner was used to manufacture a base tread. 195/65R15 tires for passenger cars were produced using each base tread to evaluate it in the static ozone test. In the case of tires for passenger cars produced using any of the unvulcanized rubber compositions of Samples 16 to 25, rubber having the same formulation was used for the cap treads of the tires for passenger cars so that the cap treads having the same condition were used.

Here, the fundamental constitution of the manufactured tires for passenger. cars is as follows.

Ply
Cord angle 90° in the direction of the periphery of the tire
Cord material Polyester
Belt
Cord angle 25°×25° in the direction of the periphery of the tire
Cord material Steel (brass plating (copper-zinc alloy plating))
Jointless band
Cord angle 0° in the direction of the periphery of the tire
Cord material Nylon The above produced tires for passenger cars were respectively allowed to stand in a 50 pphm chamber in the following condition: rim: 15×6JJ and internal pressure: 200 kPa, to measure the number of days until the tire for passenger cars generated cracks. The results are shown in Table 2.

<Tensile Test>

The above non-vulcanized rubber compositions of Samples 16 to 25 were respectively vulcanized at 150° C. for 30 minutes to thereby obtain each vulcanized rubber sheet of Samples 16 to 25.

Then, the vulcanized rubber sheets obtained in the above manner were respectively subjected to a tensile test using a dumbbell No. 3 test specimen according to JIS K6251 "Vulcanized Rubber and Thermoplastic Rubber-Method of calculation of tensile characteristics" to find the tensile strength (MPa) when the sheet was ruptured. The results are shown in Table 2.

<Rolling Resistance>

The unvulcanized rubber composition of Samples 16 to 25 were used to produce base treads in the same manner as in the case of the static ozone test. Using each base tread, tires for passenger cars which had the same constitution as that used in the static ozone test were manufactured. In the case of tires for passenger cars produced using any of the unvulcanized rubber compositions of Samples 16 to 25, rubber having the same formulation was used for the cap treads of the tires for passenger cars so that the cap tread having the same condition were used Then, a rolling resistance tester was used to make a running test using each tire for passenger cars in the following condition: load: 3.0 kN, tire inside pressure: 200 kPa and speed: 80 km/hr, to measure rolling resistance. The results are shown in Table 2.

In the column of the rolling resistance in Table 2, the measured rolling resistance is shown as a relative value when the rolling resistance of the tire for passenger cars having a base tread produced using unvulcanized rubber composition of Sample 21 was defined as 100 (standard). When the value of the rolling resistance in Table 2 is smaller, this shows that the rolling resistance is smaller and the tire is more decreased in fuel consumption.

<Evaluation>

As shown in Table 2, it is confirmed that the tires for passenger cars in which the base treads are manufactured using the unvulcanized rubber composition of Samples 16 to 20 containing silica in an amount of 20 parts by mass or more and 70 parts by mass or less and carnauba wax in an amount of 2 parts by mass or more and 15 parts by mass or less based on 100 parts by mass of the rubber component composed of diene based rubber brings about good results in all of the static ozone test, tensile strength test and rolling resistance test.

The tire for passenger cars in which the base tread is produced using the unvulcanized rubber composition of Sample 21 fails to reduce the used amount of components derived from petroleum resources since petroleum type wax is compounded instead of carnauba wax.

The tire for passenger cars in which the base tread is produced using the unvulcanized rubber composition of Sample 22 fails to obtain good results in the static ozone test since wax itself is not compounded.

The tire for passenger cars in which the base tread is produced using the unvulcanized rubber composition of Sample 23 results in a decrease in tensile strength because the content of carnauba wax is as much as 18 parts by mass based on 100 parts by mass of the diene based rubber.

The tire for passenger cars in which the base tread is produced using the unvulcanized rubber composition of Sample 24 results in a decrease in tensile strength because the content of silica is as small as 10 parts by mass based on 100 parts by mass of the diene based rubber.

The tire for passenger cars in which the base tread is produced using the unvulcanized rubber composition of Sample 25 results in an increase in rolling resistance because the content of silica is as large as 80 parts by mass based on 100 parts by mass of the diene based rubber.

It is considered from the above results that when the unvulcanized rubber compositions of Samples 16 to 20 containing silica in an amount of 20 parts by mass or more and 70 parts by mass or less and carnauba wax in an amount of 2 parts by mass or more and 15 parts by mass or less based on 100 parts by mass of the rubber component composed of diene based rubber are respectively used to form a base tread and the obtained base tread is used for a tire, the used amount of components derived from petroleum resources can be reduced and also, excellent ozone resistance of the tire and less fuel consumption of vehicles can be attained.

As this invention may be embodied in several forms without departing from the spirit of essential characteristics thereof, the foregoing embodiments are therefore illustrative and should not be interpreted as restrictive. The scope of the present invention is defined not by the foregoing descriptions but by the claims and all changes that fall within equivalence of claims are therefore intended to be embraced by the claims.

Industrial Applicability

According to the present invention, a rubber composition for a tire which can reduce the used amount of the components derived from petroleum resources and is superior in ozone resistance and anti-blooming characteristics, and also, a tire member and a tire using this composition can be provided.

Also, according to the present invention, a rubber composition for a base tread which can reduce the use of the components derived from petroleum resources and can attain a tire having strong ozone resistance and low fuel consumption of vehicles, and also, a base tread and a tire formed using this rubber composition for a base tread can be provided.

The invention claimed is:

1. A rubber composition for a tire comprising a rubber component containing a natural rubber and an epoxidized natural rubber, silica and a natural based wax, wherein:
   said silica is contained in an amount of 10 parts by mass or more based on 100 parts by mass of said rubber component;
   said natural based wax is contained in an amount of 1.28% by mass or more and 1.65% by mass or less based on the total mass of said rubber composition for a tire; and
   said natural based wax includes candelilla wax and carnauba wax.

2. The rubber composition for a tire according to claim 1, wherein said rubber composition for a tire further includes at least one type of natural based wax selected from the group consisting of rice wax and Japan wax.

3. The rubber composition for a tire according to claim 1, wherein carbon black is contained in an amount of 5 parts by mass or less based on 100 parts by mass of said rubber component.

4. The rubber composition for a tire according to claim 1, wherein the rubber composition for a tire contains a silane coupling agent.

5. A tread comprising the rubber composition for a tire of claim 1.

6. A tire comprising a tread, wherein the tread is made of the rubber composition according to claim 1.

* * * * *